United States Patent [19]
Arashi et al.

[11] 4,427,642
[45] Jan. 24, 1984

[54] PROCESS FOR DRY DESULFURIZATION OF FLUE GAS

[75] Inventors: Norio Arashi; Yukio Hishinuma, both of Hitachi; Hidetoshi Akimoto, Ibaraki; Sadao Takahashi, Hitachi; Fumito Nakajima, Hitachi; Kenichi Gomi, Hitachi, all of Japan

[73] Assignee: Babcock-Hitachi Kabushiki Kaisha, Tokyo, Japan

[21] Appl. No.: 339,088

[22] Filed: Jan. 13, 1982

Related U.S. Application Data

[63] Continuation of Ser. No. 131,893, Mar. 20, 1980, abandoned.

[30] Foreign Application Priority Data

Mar. 23, 1979 [JP] Japan .................................. 54-34617

[51] Int. Cl.$^3$ ........................ B01J 8/00; C01B 17/00; C01B 17/02
[52] U.S. Cl. ................................... 423/244; 423/569; 423/574 R; 502/56
[58] Field of Search .......... 423/242 A, 242 R, 244 A, 423/244 R, 574, 569; 436/119, 122, 123; 252/445

[56] References Cited

U.S. PATENT DOCUMENTS 3,502,427  3/1970  Johswich ............................ 423/244
3,913,253  10/1975 Juntgen ............................. 423/244
4,164,555  8/1979  Steiner .............................. 423/244
4,219,537  8/1980  Steiner .............................. 423/244

FOREIGN PATENT DOCUMENTS 1267668  5/1968  Fed. Rep. of Germany ...... 423/244

OTHER PUBLICATIONS

Sulfur, Jul./Aug., 1975, No. 119, pp. 24–26 and 45.

Primary Examiner—Gregory A. Heller
Attorney, Agent, or Firm—Mary Louise Beall

[57] ABSTRACT

Sulfur oxides contained in the flue gas from coal-fired boiler are adsorbed by an adsorbent prepared by dry-distilling a portion of fuel coal, thereby producing semi-coke, and activating the semi-coke by steam, and then the sulfur oxides-adsorbed adsorbent is heated to desorb the adsorbed sulfur oxides at a high concentration. The desorbed sulfur oxides are passed through a bed of semi-coke before the activation to recover the sulfur oxides as elemental sulfur.

17 Claims, 7 Drawing Figures

४,४२७,६४२

PROCESS FOR DRY DESULFURIZATION OF FLUE GAS

This is a continuation, of application Ser. No. 131,893, filed Mar. 20, 1980 now abandoned.

BACKGROUND OF THE INVENTION

This invention relates to a process for dry desulfurization of flue gas, and more particularly to a process for dry desulfurization of flue gas suitable for purification of combustion flue gas from boilers, furnaces, etc. using coal as fuel.

It is well known that the sulfur-containing flue gas from boilers of power plants, chemical plants, etc. is a main source for the environmental pollution, and thus various processes for desulfurization of flue gas have been so far investigated.

The process for desulfurization can be classified into two systems on the basis of sulfur recovery method. One is a system for recovering a reaction product (for example, gypsum) of sulfur oxides in the flue gas and an absorber (for example, lime), and the other is a system for recovering sulfur compounds in the flue gas as elemental sulfur. The former system has such an advantage that the process and apparatus for recovering sulfur can be much simplified, but has such a disadvantage that the product is recovered in a very large amount and thus its handling is a problem. Particularly, when coal is used as fuel, the handling of the recovered product will be more troublesome because a flue gas from coal combustion has 4 to 6 times the sulfur content than that when heavy oil is used as fuel. Thus, it is desirable to employ the latter system with less recovered product when coal is used as fuel.

The process for desulfurization to recover the elemental sulfur can be classified into a wet process and a dry process. The former is to absorb the sulfur oxides into an aqueous alkali solution and treat the absorbed solution, where a very large amount of water must be handled. On the other hand, the latter is to remove the sulfur oxides from flue gas by an adsorbent through adsorption, desorb the adsorbed oxides from the adsorbent after the adsorption, and reduce the desorbed oxides, where such a large amount of water is not required. Thus, the dry process is nowadays regarded as a desirable desulfurization technique.

However, the processes for dry desulfurization of flue gas so far proposed or utilized employ expensive activated carbon as an adsorbent, whose performance has been as far well confirmed, and thus the operating cost of desulfurization plants based on said processes is considerably high. Particularly, the amount of activated carbon is much increased since the flue gas from combustion of coal as fuel has a higher sulfur content, and furthermore, consumption or loss of activated carbon due to repetitions of adsorption and desorption in combination of deterioration of activity of adsorbent due to clogging by coal dusts or ashes inevitably increases the operating cost.

SUMMARY OF THE INVENTION

An object of the present invention is to prepare a cheap adsorbent capable of substituting for activated carbon from coal, thereby lowering the operating cost of a desulfurization plant.

Another object of the present invention is to provide a process for improving performance of the adsorbent.

Other object of the present invention is to provide a process for effectiveldy operating an adsorption column using the adsorbent.

Further object of the present invention is to provide a total process for dry desulfurization for recovering desorbed sulfur oxides as elemental sulfur without any preparation for a specific reducing agent.

Taking it into account that semi-coke has an excellent performance to adsorb sulfur oxides and the semi-coke can be readily obtained by dry distillation of coal, the present inventors have established the present invention by using the semi-coke as an adsorbent for sulfur oxides, adsorbing the sulfur oxides in a flue gas onto the semi-coke, thereby purifying the flue gas, heating the sulfur oxides-adsorbed semi-coke, thereby desorbing the sulfur oxides at a high conentration and regenerating the semi-coke, and recyclically using the semi-coke.

It is preferable to use, as coal for a raw material for adsorbent, a portion of coal to be combusted as fuel. This does not require separate transportation of specific adsorbent such as activated carbon, etc. or specific coal for preparing the adsorbent from the transportation of coal as fuel. However, not all kinds of coal can always be converted to semi-coke having a preferable adsorption performance by dry distillation. However, in that case, the coal that can show an excellent adsorption performance when converted to semi-coke, can be selected and prepared separately from the coal prepared for fuel, and can be converted to semi-coke and used as the adsorbent. In that case, the conversion to semi-coke can be carried out anywhere as desired.

The semi-coke prepared as the adsorbent can be used as a reducing agent for reduction of sulfur compounds, another important treatment in the desulfurization plant besides the application as adsorbent. Thus, a dry flue gas desulfurization technique of elemental sulfur recovery type without any use of water or without any separate transport of an absorber for sulfur oxides or a reducing agent has been established in the present invention by dry distilling coal as simply combusted, thereby converting the coal to semi-coke, utilizing the semi-coke partly as an adsorbent for sulfur oxides and partly as a reducing agent for conversion of sulfur oxides to elemental sulfur.

DESCRIPTION OF PREFERRED EMBODIMENTS

The present invention will be described in detail below, referring to one embodiment.

Figure 1:
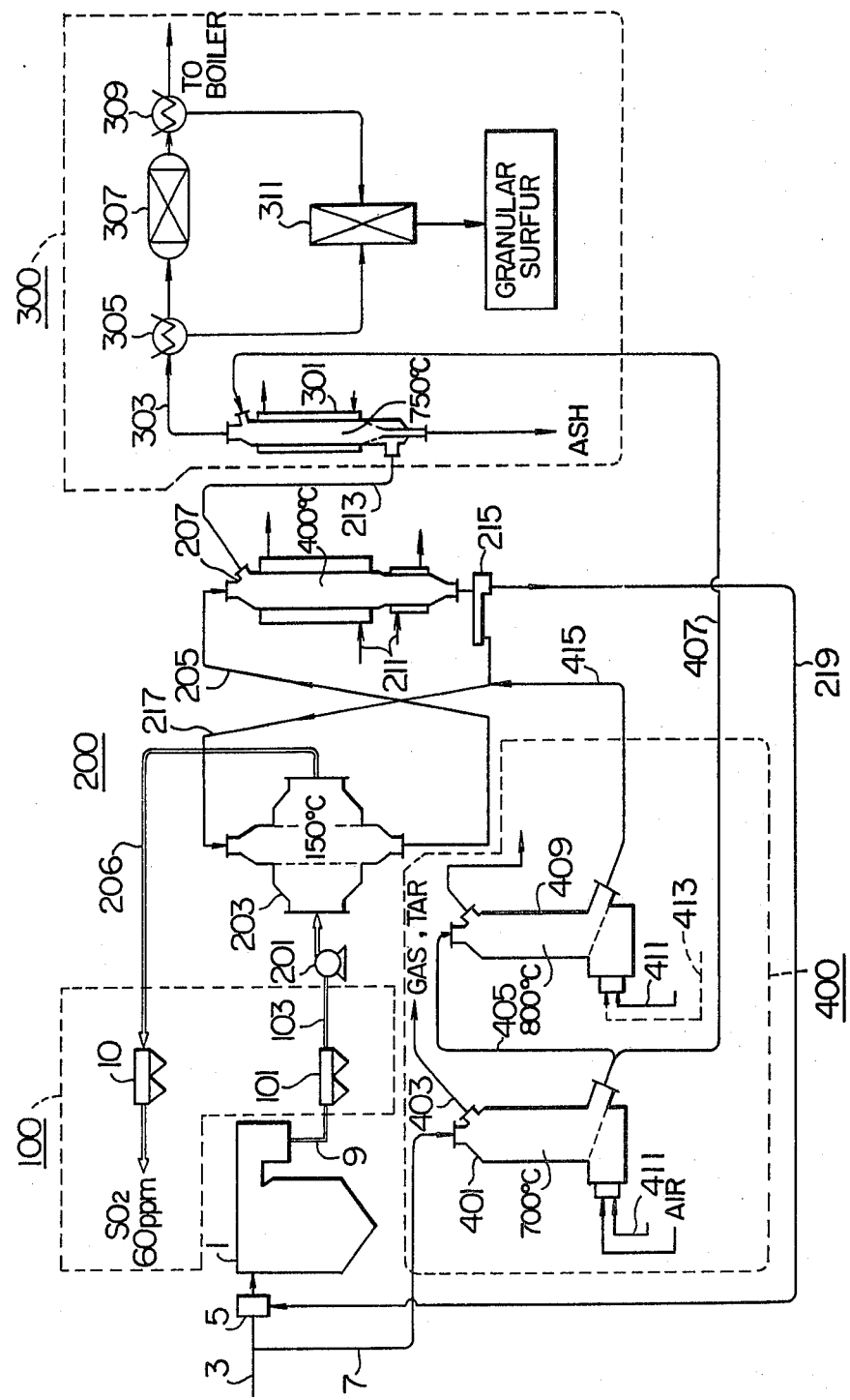
FIG. 1 is a total flow diagram of a desulfurization plant designed for carrying out the present process for dry desulfurization of flue gas.

In FIG. 1, a total flow diagram of a desulfurization plant suitable for carrying out the present process for dry desulfurization of flue gas is given. Steps to be carried out in the desulfurization plant can be divided mainly into dust removal step 100, flue gas treatment step 200, sulfur recovery step 300, and adsorbent (desulfurizer) preparation step 400.

Coal to coal boiler 1 is supplied through coal conduit 3 and pulverized by pulverizer 5, and the pulverized coal is supplied to coal boiler 1. The combustion gas generated in coal boiler 1 passes through flue gas conduit 9 to electrostatic dust precipitator 101, where the dusts contained in the flue gas are removed, and then passes through conduit 103 to adsorption column 203 after pressure increase by blower 201. An adsorbent prepared in adsorption (desulfurizer) preparation step 400 is filled in a bed in adsorption column 203, and the flue gas is freed from sulfur oxides contained therein by passage through the bed of adsorbent, and passes through conduit 206 and bag filter 105 for removing dusts from the flue gas, and the resulting purified flue gas is vented to atmosphere from a stack. The adsorbent that has adsorbed the sulfur oxides and has reached a saturation in adsorption column 203 is withdrawn through adsorbent transfer conduit 205 and led to desorption column 207. A gas generated in a hot gas generator (not shown in the drawing) is supplied to desorption column 207 through inert gas recycle conduit 211, and the temperature within desorption column 207 is kept at 300°–400° C. As a result, the sulfur oxides-adsorbed adsorbent releases sulfur oxides at a high concentration by desorption, and the sulfur oxides are withdrawn through conduit 213. The adsorbent freed from the sulfur oxides by desorption recovers its adsorbing capacity and is led to classifier 215 where abraded adsorbent is removed, and then returned to adsorption column 203 through adsorbent transfer conduit 217. The abraded adsorbent removed by classifier 215 is sent to boiler 1 through conduit 219, and combusted together with other fuel coal.

On the other hand, the sulfur oxides at a high concentration withdrawn through highly concentrated $SO_2$ transfer conduit 213 are led to reduction column 301, where semi-coke prepared in adsorbent (desulfurizer) preparation step 400 is filled and reduction column 301 is heated by combustion of a portion of the semi-coke, thereby heating the inside of the reduction column to 600°–800° C. As a result, the sulfur oxides at a high concentration is converted to vapor of elemental sulfur by reducing action of semi-coke. However, a portion of the sulfur oxides remains unreacted at that stage, and other portion thereof reacts with steam brought therein together with the sulfur oxides at a high concentration to form hydrogen sulfide. Compositions of the gas are 29% $SO_2$, 14% $CO_2$, and 57% $H_2O$ at the outlet of desorption column 207 and 7.6% $H_2S$, 1.3% $SO_2$, 8.2% $S_8$, 40.2% $H_2O$ and 1.9% $H_2$ at the outlet of reduction column 301, though dependent upon the kind of coal and operating conditions.

The effluent gas from the reduction column is led to sulfur condenser 305 through sulfur vapor transfer conduit 303, where elemental sulfur is recovered in a liquid sulfur state, whereas remaining gas is led to a Claus reactor 307, where elemental sulfur is obtained according to the well known Claus reaction. The elemental sulfur is recovered in a liquid sulfur state in sulfur condenser 309, and is led to granulation column 311 together with the liquid sulfur recovered in sulfur condenser 305.

On the other hand, a portion of coal having particle sizes of about 5–about 10 mm before the pulverization in pulverizer 5 is led to dry distillation oven 401 through coal supply conduit 7 for dry distillation. oven 401 through coal supply conduit 7 for dry distillation. Dry distillation oven 401 is heated to about 600°–about 700° C., where the coal is converted to dry distillation gas, tar and semi-coke, and the gas and tar are withdrawn through conduit 403 and the semi-coke through conduit 405. A portion of the semi-coke is led to reduction column 301 through conduit 407, but most of the semi-coke is led to activation oven 409 through conduit 405.

Steam and air are supplied to the activation oven through conduit 411 and conduit 413, respectively, and the semi-coke is made to react with steam therein, where oxidation of the semi-coke proceeds to form adsorption-active pores on the semi-coke. The activation reaction is carried out at about 700°–about 900° C. The activated semi-coke has an excellent performance as a $SO_2$ adsorbent. Thus, the semi-coke is withdrawn from activation oven 409 through conduit 415 in an amount corresponding to that of the abraded adsorbent removed by classifier 215, and supplied to conduit 217, whereby the total amount of the adsorbent is maintained constant in adsorption column 203.

Heavy tarry matters are separated from the gas and tar generated in dry distillation oven 401 and withdrawn through conduit 403 and supplied to boiler 1 as fuel (not shown in the drawing). The gas is rich in hydrogen and methane, and thus can be subjected to combustion and heat recovery in the same manner as the tarry matters, but, if necessary, can be converted to a gas richer in hydrogen by the well known reformer, and can be used as a reducing agent in reduction column (not shown in the drawing).

In activation oven 409, a portion of the carbon in the semi-coke is gasified by steam and oxygen, generating a gas rich in hydrogen, carbon monoxide and carbon dioxide. Thus, the generated gas is returned to boiler 1 or combusted in a combuster in another system in the same manner as the dry distillation gas to carry out combustion and heat recovery.

In the foregoing description, all the amount of semi-coke to be used as the adsorbent is passed through the activation step, but much steam is contained in the flue gas, as is well known, and also oxygen is contained therein. Thus, even if the unactivated semi-coke is used as the adsorbent, it can undergo reaction similar to activation in adsorption column 203 through contact with the flue gas.

To the knowledge of the present inventors', the adsorption performance of the semi-coke obtained through the activation step is gradually decreased by use, whereas that of the semi-coke obtained only by dry distillation is increased by use. That is, when, for example, some level of adsorption performance can be obtained only by dry distillation, though dependent upon the kind of coal, it is sometimes desirable to omit the activation step.

The following Tables 1 and 2 show heat balance and coal balance in a coal-fired power plant using said desulfurization plant. In the desulfurization plant, and the percent utilization of heat and coal throughout the entire power plant amounts to 97%–98%. Thus, the present invention is considerably advantageous, as compared with the conventional wet desulfurization process using an after-burner.

On the other hand, the by-product recovered in said plant is sulfur, and thus the bulk volume of sulfur is about 1/5 times, for example, that of gypsum as by-product, and also no waste water is discharged as an effluent from the plant according to the present invention. These are advantages of the present invention.

TABLE 1

| Breakdown | | Percent utilization in Boiler | Percent consumption |
|---|---|---|---|
| Boiler combustion | | 93.6 | |
| Adsorbent | Abraded | 3.5 | |
|  | Consumed |  | 1.0 |
| Dry distillation and activation gas | for dry distillation and activation |  | 0.2 |
|  | for heating $SO_2$— rich gas |  | 0.25 |
| Tar | returned for boiler | 0.45 |  |
|  | adsorbent | 0.45 |  |
| Total | | 97.6 | 1.9 |

TABLE 2

| Breakdown | | Percent utilization in Boiler | Percent consumption |
|---|---|---|---|
| Boiler combustion | | 93.3 | |
| Adsorbent preparation | Adsorbent Abraded Consumed | 3.2 | 0.9 |
|  | Dry distillation and activation gas |  | 2.0 |
|  | Tar returned for boiler | 0.3 |  |
|  | consumed |  | 0.3 |
| Total | | 96.8 | 3.2 |

Figure 2:
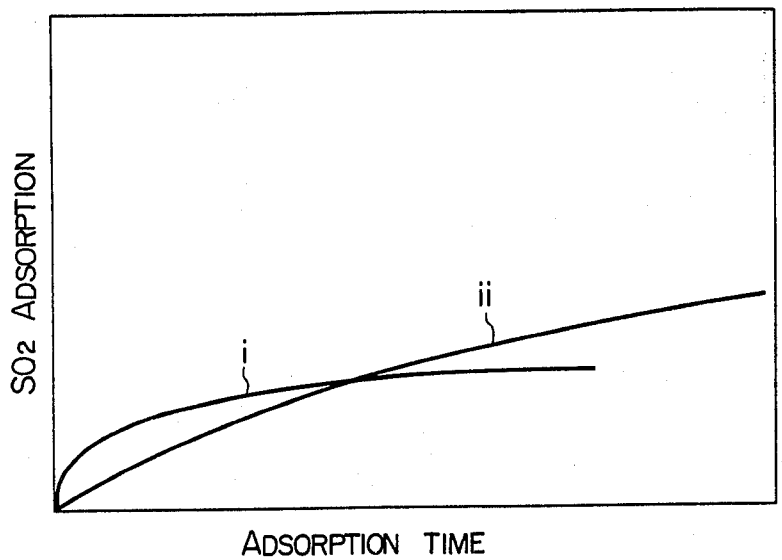
FIG. 2 is a characteristic diagram of $SO_2$ adsorption performance of semi-coke and commercially available activated carbon.

As described before, the activated semi-coke has a better initial activity than that of commercially available active carbon, but the adsorption activity is drastically deteriorated after some period of adsorption. The behavior is shown in FIG. 2, where the curve represented by "i" shows the tendency of semi-coke, and that by "ii" the tendency of commercially available activated carbon. When compared, for example, in apparent saturated adsorption capacity, that of semi-coke is about ¼–about ⅓ that of the commercially available activated carbon. The unactivated semi-coke has a low initial activity and also a low saturated adsorption capacity. Thus, in the adsorption of $SO_2$ by semi-coke, it is indispensable to use a desulfurization column of moving bed type or fluidizing bed type, because repetitions of adsorption and regeneration must be carried out more frequently in the fixed bed type. However, the semi-coke is very readily abraded, and thus it is a problem to use a desulfurization column of fluidized bed type. Pulverization of adsorbent not only makes reutilization difficult, but also contaminates the treated gas with the powder. Such problems also appear in using a desulfurization column of moving bed type. Thus, a desulfurization column is constructed in the following manner to solve these problems.

Figure 3:
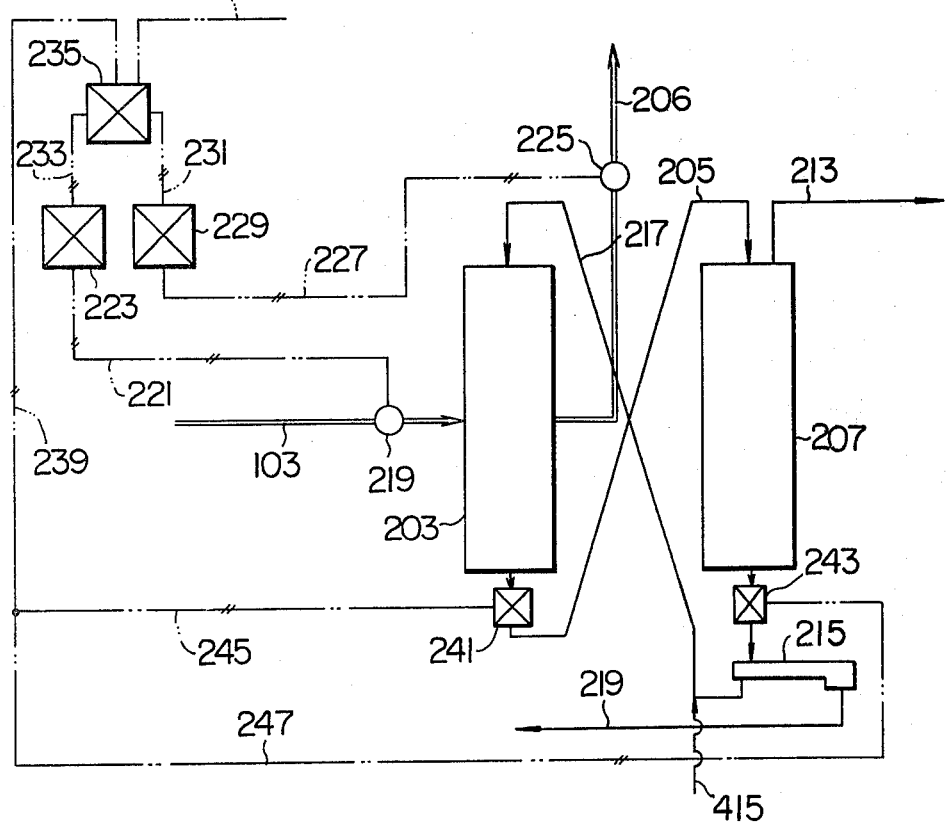
FIG. 3 is a control flow diagram for carrying out recycle of an adsorbent.

FIG. 3 shows an operating control system for desulfurization column 203 of moving bed type, where a combustion flue gas is supplied to desulfurization column of moving bed type 203 through conduit 103, and detector point 219 detects a $SO_2$ concentration, and transmits the detected signal to $SO_2$ detector 223 through control line 221. The effluent flue gas from desulfurization column of moving bed type 203 is withdrawn through conduit 206. Detector point 225 detects a $SO_2$ concentration, and transmits the detected signal to $SO_2$ detector 229 through control line 227. The $SO_2$ concentrations as signals are then transmitted to a computer 235 through control lines 231 and 233, respectively. Moving speed of semi-coke, combustion gas temperature, flow rate, and other signals of desulfurization column of moving bed type 203 are continuously fed to computer 235 through control line 237. Judging a moving speed in the desulfurization column of moving bed type in comparison of the moving speed as now fed through a pattern recognition based on the present percent desulfurization and said input signals, the computer resets the moving speed and instructs it as a signal to dischargers 241 and 243 provided at the bottoms of desulfurization column of moving bed type 203 and desorption column of moving bed type 207 through control lines 245 and 247, respectively. As a result, the adsorbent can move at a moving speed ranging from about 0.1 m/hr to about 1.0 m/hr through the desulfurization column of moving bed type, and the desired desulfurization performance can be obtained.

Figure 4:
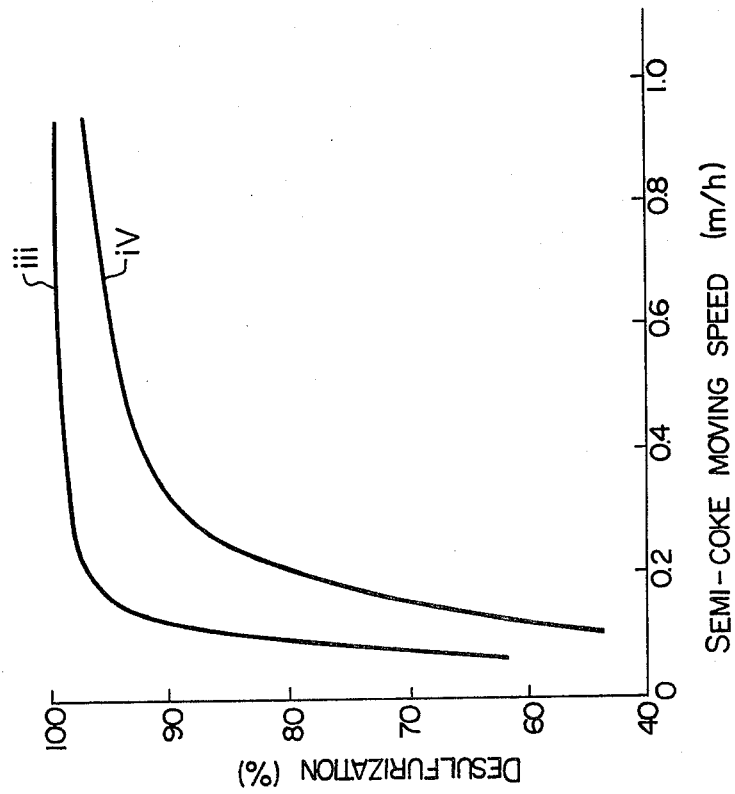
FIG. 4 is a characteristic diagram showing relations between semi-coke moving speed and percent desulfurization in a moving bed-type adsorption column (desulfurization column).

Relations between adsorbent moving speed $V_{coal}$ and percent desulfurization $\eta_{SO2}$ in desulfurization column of moving bed type 203 according to the foregoing embodiment are shown in FIG. 4, where the curve represented by "iii" shows the tendency where the $SO_2$ concentration at the inlet of the desulfurization column of moving bed type is 1,000 ppm whereas the curve by "iv" shows the tendency where the $SO_2$ concentration is 2,000 ppm. Semi-coke used as the adsorbent is prepared by dry distilling sub-bituminous coal at 700° C. in a nitrogen atmosphere for 2 hours, and activating it at 800° C. in a steam atmosphere for 1.5 hours, and the temperature of combustion flue gas is 150° C. The adsorbent bed in the desulfurization column of moving bed type is 1.5 m long in the flow direction of flue gas and 8 m long in the adsorbent moving direction approximately perpendicular to the flow direction of flue gas. As is obvious from FIG. 4, the percent desulfurization is increased with increasing moving speed of adsorbent, and relations of an increasing function are seen therebetween even if the concentration is changed. That is, the percent desulfurization can be given by the following equation:

$$\eta_{SO2} = f(Z, L, V_{coal}, V_G, B_{SO2}, D_{coal}, Q_{in}, k, B_{H,C,O}) \quad (1)$$

wherein:
Z: moving distance of semi-coke
L: length of semi-coke bed through which the gas passes.
$V_G$: gas flow velocity
$V_{coal}$: moving speed of semi-coke
$B_{SO2}$: $SO_2$ concentration of combustion flue gas
$O_{SO2}$: $SO_2$ concentration of flue gas from desulfurization column of moving bed type
$D_{coal}$: particle size of semi-coke
$Q_{in}$: degree of regeneration of semi-coke
$B_{H,C,O}$: concentrations of other components than $SO_2$ in combustion flue gas k: adsorption activity constant of coal species and semi-coke as prepared.

If the coal species, conditions for preparing semi-coke and operating conditions for the desulfurization column of moving bed type are set, relations between $Z$, $L$, $D_{coal}$, $Q_{in}$ and k can be presumed constant as the following equation:

$$K = f(Z, L, D_{coal}, Q_{in}, k) \quad (2)$$

Thus, equation (1) will be given substantially as follows:

$$\eta_{SO2} = f(K, V_{coal}, V_G, B_{SO2}, O_{SO2}) \quad (3)$$

Thus, an optimum moving speed of semi-coke through the desulfurization column of moving bed type can be determined by allowing the computer to judge the pattern recognition of equation (3).

Figure 5:
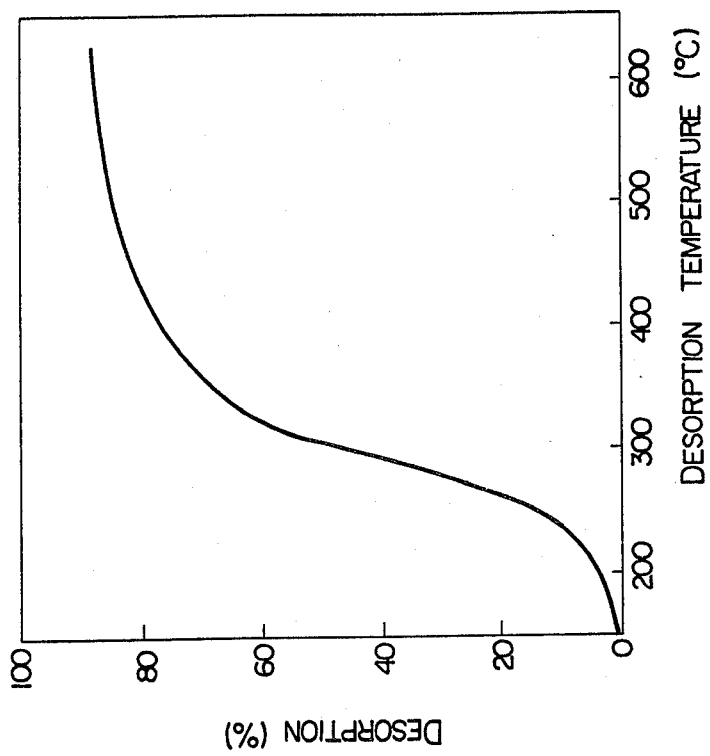
FIG. 5 is a characteristic diagram showing relations between percent desorption and desorption temperature in a moving bed-type desrption column.

On the other hand, desorbing operation is carried out by heating. FIG. 5 shows a typical example of relations between percent desorption of semi-coke and desorbing temperature, where subbituminous coal "Taiheiyo" is used, and a temperature elevation rate is about 20° C./min. The percent desorption tends to be saturated at a temperature of about 550° C. upwards. To attain the control of the present process, the desorption temperature of the desorption column of moving bed type must be able to absorb a change in load due to the change in amount of semi-coke in the desulfurization column of moving bed type, and it is necessary to operate the desorption at 550° C. or higher.

According to the present invention, a high desulfurization performance can be maintained even by using the semi-coke. Furthermore, according to the present invention, the percent desulfurization can be always maintained constant against such disturbance factors as a change in boiler load, a change in sulfur oxide concentration of combustion flue gas due to uneven quality of coal, a change in adsorption capacity due to uneven adsorption activity, etc. due to dry distillation and activation conditions, by detecting a sulfur oxide concentration of flue gas at the outlet of the desulfurization column of moving bed type, and moving the semi-coke through the desulfurization column of moving bed type.

It is preferable to locate the detection point for the sulfur oxides at a position as near as possible to the outlet of the desulfurization column of moving bed type. Since the percent desulfurization changes in the moving direction of semi-coke, a response to a change in load can be more rapidly and effectively made, if at least two detection points are provided at different levels in the moving direction of semi-coke and detected values of sulfur oxide concentrations from the respective detection points as signals are put into the computer.

Figure 6:
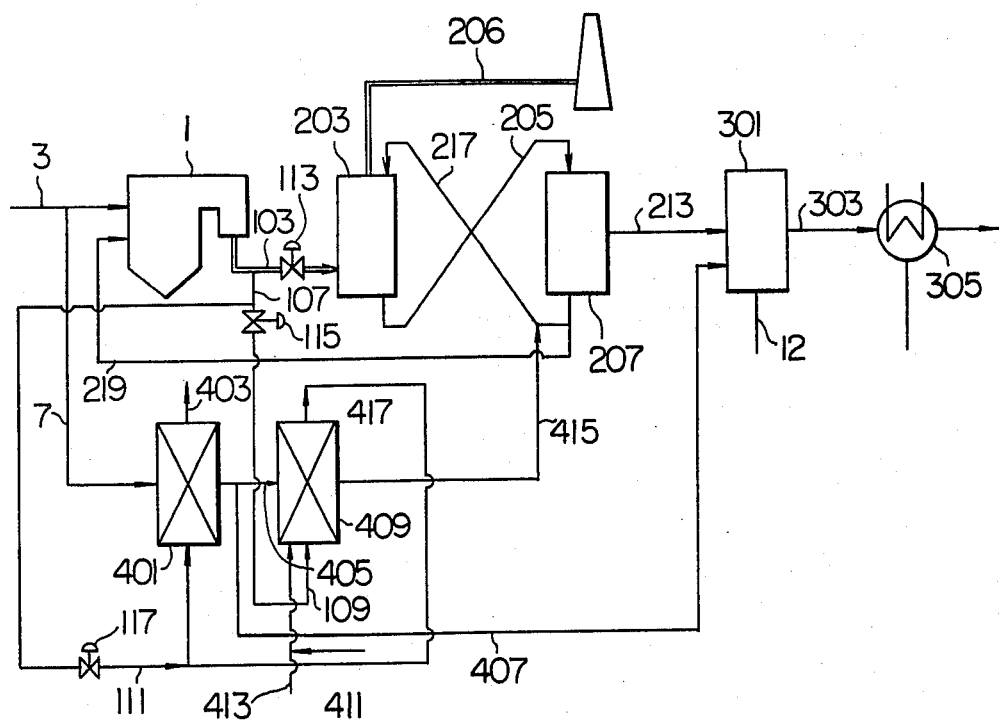
FIG. 6 is a partial flow diagram of a desulfurization plant designed for utilizing various kinds of gas in the preparation of an adsorbent.

FIG. 6 is a partial improvement in the embodiment shown in FIG. 1. As is obvious from FIG. 1, Tables 1 and 2, etc., coal, heat and steam are required for preparing an adsorbent from coal. The present embodiment shows utilization of combustion flue gas in adsorbent (desulfurizer) preparation step 400, where the combustion flue gas from boiler 1 is divided into conduit 103 and conduit 107. Conduit 107 is further divided into conduit 109 and conduit 111. For gas rate control, damper 113 is provided in conduit 103, damper 115 in conduit 109, and damper 117 in conduit 111. Conduit 109 is connected to activation oven 409. A dust remover is provided in conduit 109, depending upon the kind of fuel (not shown in the drawing) to capture ashes, etc. Conduit 111 is joined to conduit 417 from activation oven 409 and connected to dry distillation oven 401.

Composition of combustion flue gas from boiler depends upon the kind of fuel and boiler operating conditions, and in the case of coal-fired boiler, the flue gas contains water, carbon monoxide, carbon dioxide, nitrogen, oxides of sulfur and nitrogen, etc., and particularly 7 to 12% of water taking part in the activation step.

According to the results of basic tests by a device for measuring a change in weight by heat (gas pass through type and inner diameter of reactor tube: 8 mm), it has been found that the amount of water only contained in combustion flue gas is not enough for the effective activation.

Figure 7:
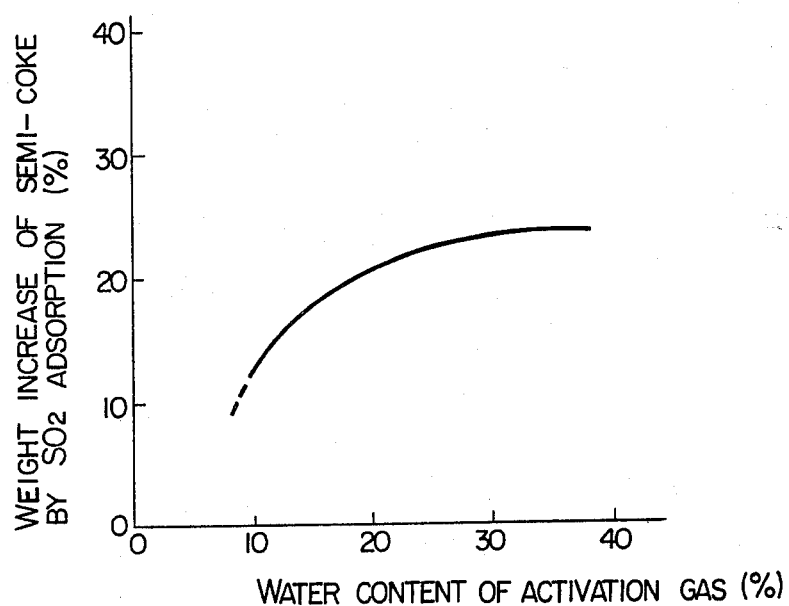
FIG. 7 is a diagram showing relations between percent weight increase of semi-coke by adsorption of $SO_2$ gas, measured by a device for measuring weight change while adsorbing, and water content of activation gas.

FIG. 7 shows the result of adsorption tests of semi-coke obtained by changing water content of activation gas, where the activation temperature is 800° C. and a simulation combustion flue gas used in the adsorption tests is made to have 2% $SO_2$, 6% $O_2$, and 10% $H_2O$. Th adsorption temperature is 150° C. As is obvious from FIG. 7, the adsorption capacity of resulting semi-coke is improved with increasing water content of activation gas so long as the activation time and activation temperature remain the same, and the influence of water content becomes less at 25% water content or higher. Thus, the activation is carried out with a high efficiency by the water contained in the combustion flue gas and steam separately added through conduit 413 to the combustion flue gas. Only the sensible heat of the combustion flue gas will not satisfy the heat requirement for the activation oven, but partial oxidation of semi-coke is carried out by air supplied through conduit 411 to satisfy the heat requirement.

According to the present embodiment, the hot gas from activation oven 409 is supplied to dry distillation oven 401 through conduit 417 and used as a heat source for dry distillation oven 401. Effluent gas from the dry distillation oven is withdrawn through conduit 403 and combusted in the boiler or in a combustor in the system to effect heat recovery (not shown in the drawing).

On the other hand, activation oven 409 is operated at a temperature of 800° C. from the viewpoint of heat balance, and the combustion flue gas from boiler 1 is at 450° C. Thus, partial oxidation of semi-coke is required in activation oven 409. When the activation oven and the dry distillation oven are operated batchwise, the heat requirement can be balanced in the stationary state by supplementing the heat loss and the heat of reaction. The reaction of semi-coke with steam in activation oven 409 is an endothermic reaction requiring about 2,700 Kcal/kg, and the heat of thermal decomposition of dry distillation oven 401 is about 450 Kcal/kg. When a coal-fired boiler generating a combustion flue gas at a rate of 30,000 $Nm^3$/hr is employed, coal must be burned in the boiler at a rate of 3.78 tons/hr. When the $SO_2$ concentration of combustion flue gas from the boiler is presumed to be 1,000 ppm, and the percent desulfurization to be 95%, semi-coke will be recycled between the adsorption column and the desorption column at a rate of about 1.0 ton/hr. In the stationary operation of the desulfurization plant, about 10% of the semi-coke to be recycled is deteriorated and abraded, and thus fresh semi-coke must be supplemented.

In view of the amount of partially oxidized semi-coke in the activation oven in the heat requirement for the activation oven, 0.49 tons/hr of semi-coke can be produced by dry distilling about 0.89 tons/hr of coal in the dry distillation oven.

According to the foregoing embodiment, the boiler combustion gas is directly introduced into the activation oven, and the heat requirement for the activation oven is supplemented by partial oxidation of semi-coke, but the heat of combustion obtained by combusting other fuel in a secondary combustor separately provided can be used as the heat source for the activation oven.

In addition to the effects attained in the foregoing embodiment, the following further effects can be obtained in the present embodiment:

(1) An activation gas with a high heat content can be provided, and (2) a composition of activation gas to be supplied to the activation oven can be stabilized, whereby semi-coke can be obtained as an activated product with stabilized properties.

What is claimed is:

1. A process for the dry desulfurization of flue gas containing sulfur oxides, comprising:
   providing fuel coal capable of being converted to semi-coke;
   combusting one portion of said coal as at least part of the fuel in a boiler or furnace to produce a flue gas containing sulfur oxides;
   separately dry distilling a second portion of said coal to produce a semi-coke adsorbent;
   contacting the flue gas with the adsorbent to adsorb the sulfur oxides, thereby removing the sulfur oxides from the flue gas while abrading a part of the adsorbent to produce waste adsorbent;
   heating the sulfur oxides-adsorbed semi-coke adsorbent, thereby desorbing an effluent containing a high concentration of sulfur oxides and simultaneously regenerating the semi-coke while abrading another part of the adsorbent to produce waste adsorbent;
   conducting the effluent to a process for the recovery of elemental sulfur therefrom;
   recyclically using the regenerated semi-coke in the contacting step; and
   combusting all the waste adsorbent as fuel in said boiler or furnace.

2. A process for the dry desulfurization of flue gas containing sulfur oxides, comprising:
   providing fuel coal capable of being converted to semi-coke;
   combusting a portion of said coal as at least part of the fuel in a boiler or furnace to produce a flue gas containing the sulfur oxides;
   separately dry distilling a second portion of said coal to produce a semi-coke adsorbent;
   moving the semi-coke adsorbent through a moving bed type desulfurization column from the top of the column downwards;
   contacting the flue gas with the adsorbent to adsorb the sulfur oxides, thereby removing the sulfur oxides from the flue gas while abrading a part of the adsorbent to produce waste adsorbent;
   heating the sulfur oxides-adsorbed semi-coke adsorbent, thereby desorbing an effluent containing a high concentration of sulfur oxides and simultaneously regenerating the adsorbent while abrading another part of the adsorbent to produce waste adsorbent;
   conducting the desorbed sulfur oxides to a process for the recovery of elemental sulfur therefrom;
   recyclically using the regenerated semi-coke in the contacting step; and
   combusting all the waste adsorbent in the boiler or furnace as fuel.

3. A process for dry desulfurization of flue gas, where sulfur oxides are removed from a flue gas produced by boilers or furnaces using coal capable of being converted to semi-coke as at least a part of the fuel, which comprises:
   adsorbing the sulfur oxides onto a semi-coke adsorbent prepared by dry distillation of a part of the same coal as that used in the furnace or boiler, thereby removing the sulfur oxides from the flue gas while abrading a portion of the adsorbent to produce waste adsorbent, then heating the sulfur oxides-adsorbed semi-coke adsorbent, thereby desorbing the sulfur oxides at a high concentration and simultaneously regenerating the semi-coke adsorbent while abrading a portion of the adsorbent to produce waste adsorbent, and recyclically using the semi-coke in the adsorption, when conducting the desorbed sulfur oxides to a process for the recovery of elemental sulfur, and returning the waste adsorbent produced in the adsorption and desorption to the boilers or furnaces for combustion as fuel.

4. A process according to claim 2 or 3 wherein the dry distillation is conducted at 600° to 700° C.

5. A process according to claim 2 or 3 wherein the dry distillation is conducted in an $N_2$ atmosphere.

6. A process according to claim 1, 2 or 3 wherein a portion of the sulfur oxides in the effluent are reduced to elemental sulfur by using the semi-coke adsorbent as a reducing agent.

7. A process according to claim 6, wherein the sulfur oxides remaining in the effluent after reduction are subjected to the Claus reaction.

8. A process according to claims 1, 2 or 3 wherein the semi-coke is activated by steam and an oxygen-containing gas after the dry distillation.

9. A process according to claim 8, wherein the semi-coke is activated by steam and an oxygen-containing gas at a temperature of 700° to 900° C.

10. A process according to claim 6, wherein the reduction is conducted at a temperature of 600° to 800° C. produced by combusting a portion of the semi-coke.

11. A process according to claim 2, wherein a sulfur oxide concentration of the flue gas passing through the desulfurization column of moving bed type is detected at the inlet side and the outlet side of the desulfurization column, and a rate of withdrawing the semi-coke from the desulfurization column is adjusted at least by the respective detected signals and a set percent desulfurization.

12. A process according to claim 2, wherein the adjustment of the rate of withdrawing the semi-coke is made in view of actual operating conditions of the desulfurization column as information in addition to the detected signals of the sulfur oxide concentration and the set percent desulfurization.

13. A process according to claim 2, wherein the adsorbed semi-coke arriving at the bottom of the desulfurization column is supplied to a desorption column, and heated therein, thereby regenerating an adsorption activity, and then supplied again to the desulfurization column.

14. A process for the dry desulfurization of flue gas containing sulfur oxides, comprising:

providing fuel coal capable of being converted to semi-coke;

combusting one portion of said coal as at least part of the fuel in a boiler or furnace to produce a flue gas containing sulfur oxides;

separately dry distilling a second portion of said coal at a temperature of 600°–700° C. in an $N_2$ atmosphere to produce a semi-coke adsorbent;

contacting the flue gas with the adsorbent to adsorb the sulfur oxides, thereby removing the sulfur oxides from the flue gas while abrading a part of the adsorbent to produce waste adsorbent;

heating the sulfur oxides-adsorbed semi-coke adsorbent, thereby desorbing an effluent containing a high concentration of sulfur oxides and simultaneously regenerating the semi-coke while abrading another part of the adsorbent to produce waste adsorbent;

conducting the effluent to a process for the recovery of elemental sulfur therefrom;

recyclically using the regenerated semi-coke in the contacting step; and combusting all the waste adsorbent as fuel in said boiler or furnace.

15. A process according to claim 1, wherein heavy tarry matter is generated from the coal in the dry distilling step and is returned to said boiler or furnace as fuel.

16. A process according to claim 1, wherein a gas comprising hydrogen and methane is generated from the coal in the dry distilling step and is returned to said boiler or furnace as fuel.

17. A process according to claim 8, wherein a gas comprising hydrogen, carbon monoxide and carbon dioxide is generated from the semi-coke and is returned to said boiler or furnace as fuel.

* * * * *

UNITED STATES PATENT AND TRADEMARK OFFICE
CERTIFICATE OF CORRECTION

PATENT NO. : 4,427,642
DATED : January 24, 1984
INVENTOR(S) : Norio Arashi et al It is certified that error appears in the above-identified patent and that said Letters Patent is hereby corrected as shown below:

On page 1 of the patent, the information regarding the

Assignee should read as follows:

-- Assignee: Hitachi, Ltd. and Babcock-Hitachi Kabushiki

Kaisha, both of Tokyo, Japan --

Signed and Sealed this

Tenth Day of April 1984

[SEAL]

Attest:

GERALD J. MOSSINGHOFF

Attesting Officer

Commissioner of Patents and Trademarks